(12) United States Patent
Egawa

(10) Patent No.: US 8,094,209 B2
(45) Date of Patent: Jan. 10, 2012

(54) IMAGING SIGNAL PROCESSING APPARATUS

(75) Inventor: Yoshitaka Egawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 782 days.

(21) Appl. No.: 12/123,816

(22) Filed: May 20, 2008

(65) Prior Publication Data

US 2008/0291312 A1 Nov. 27, 2008

(30) Foreign Application Priority Data

May 21, 2007 (JP) .................................. 2007-134567

(51) Int. Cl.
*H04N 9/73* (2006.01)
(52) U.S. Cl. ................. 348/225.1; 348/222.1; 348/223.1
(58) Field of Classification Search .................... None
See application file for complete search history.

(56) References Cited

U.S. PATENT DOCUMENTS 4,571,635 A * 2/1986 Mahmoodi et al. ........... 358/510

FOREIGN PATENT DOCUMENTS

| JP | 4-235472 | 8/1992 |
|---|---|---|
| JP | 5-168029 | 7/1993 |
| JP | 2001-245307 | 9/2001 |
| JP | 2002-10108 | 1/2002 |
| JP | 2005-303731 | 10/2005 |

OTHER PUBLICATIONS

U.S. Appl. No. 12/813,129, filed Jun. 10, 2010, Egawa.
U.S. Appl. No. 12/616,391, filed Nov. 11, 2009, Egawa
U.S. Appl. No. 12/019,191, filed Jan. 24, 2008, Yoshitaka Egawa, et al.
U.S. Appl. No. 12/019,173, filed Jan. 24, 2008, Yoshitaka, Egawa.
U.S. Appl. No. 11/967,585, filed Dec. 31, 2007, Yoshitaka Egawa, et al.
U.S. Appl. No. 11/815,903, filed Aug. 9, 2007, Hiroto Honda, et al.

* cited by examiner

*Primary Examiner* — David Ometz
*Assistant Examiner* — Angel L Garces-Rivera
(74) *Attorney, Agent, or Firm* — Oblon, Spivak, McClelland, Maier & Neustadt, L.L.P.

(57) ABSTRACT

An image signal processing apparatus includes a sensing section which includes R, G, and B pixels and produces R, G, and B color signals, a first adding section which adds, while weighting pixels, a color signal of a center pixel of a pixel arrangement and color signals of the peripheral pixels to produce a first addition signal, a contour signal generating section which generates a contour signal from the color signals before the addition, a second adding section which adds the contour signal to the first addition signal to produce a second addition signal, a ratio coefficient calculation section which calculates a ratio coefficient of an average value of the R, G, and B color signals to a sum-up value of the average values, and an RGB signal generating section which generates new R, G, and B signals using the ratio coefficients and the first or second addition signal.

10 Claims, 14 Drawing Sheets

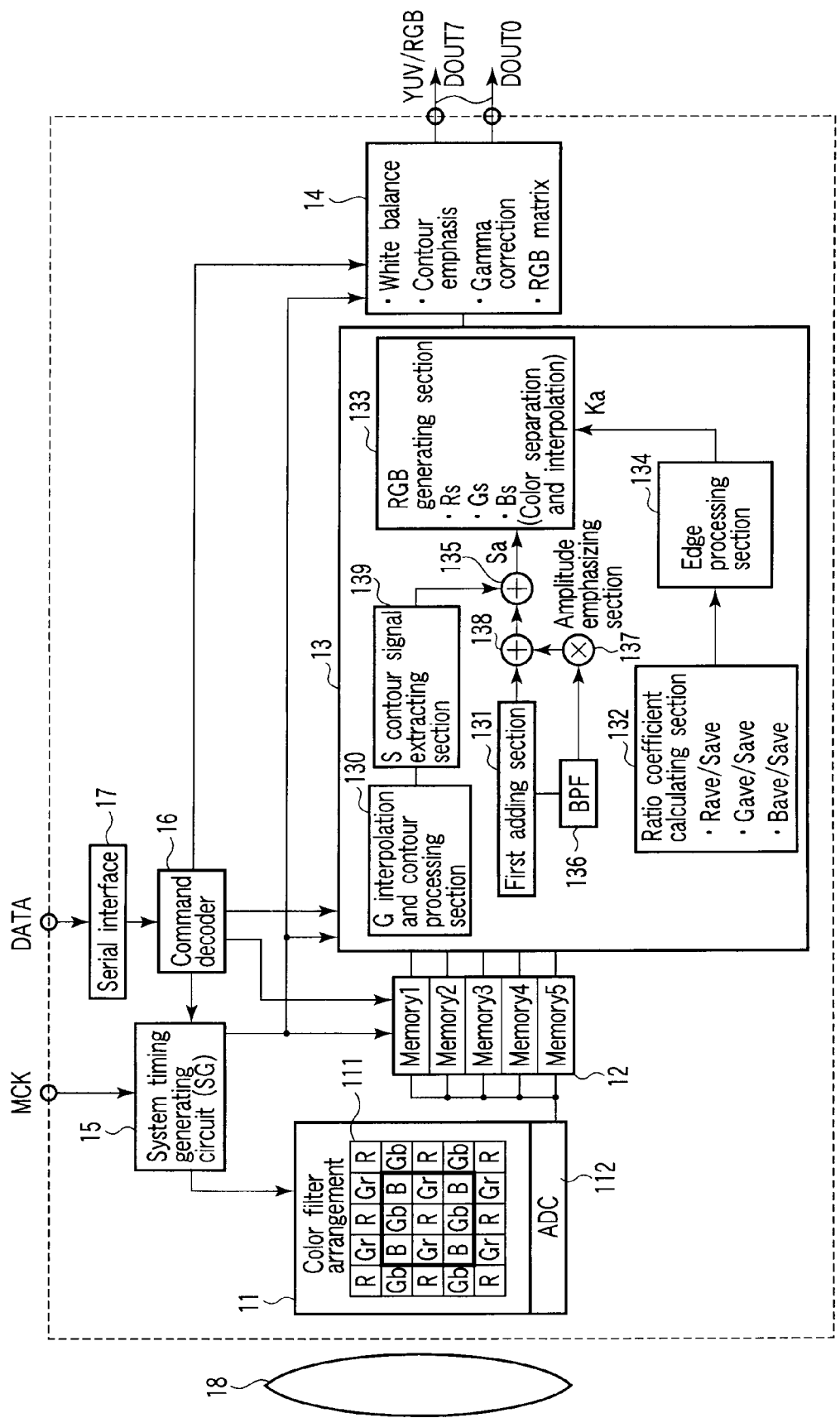
F I G. 1

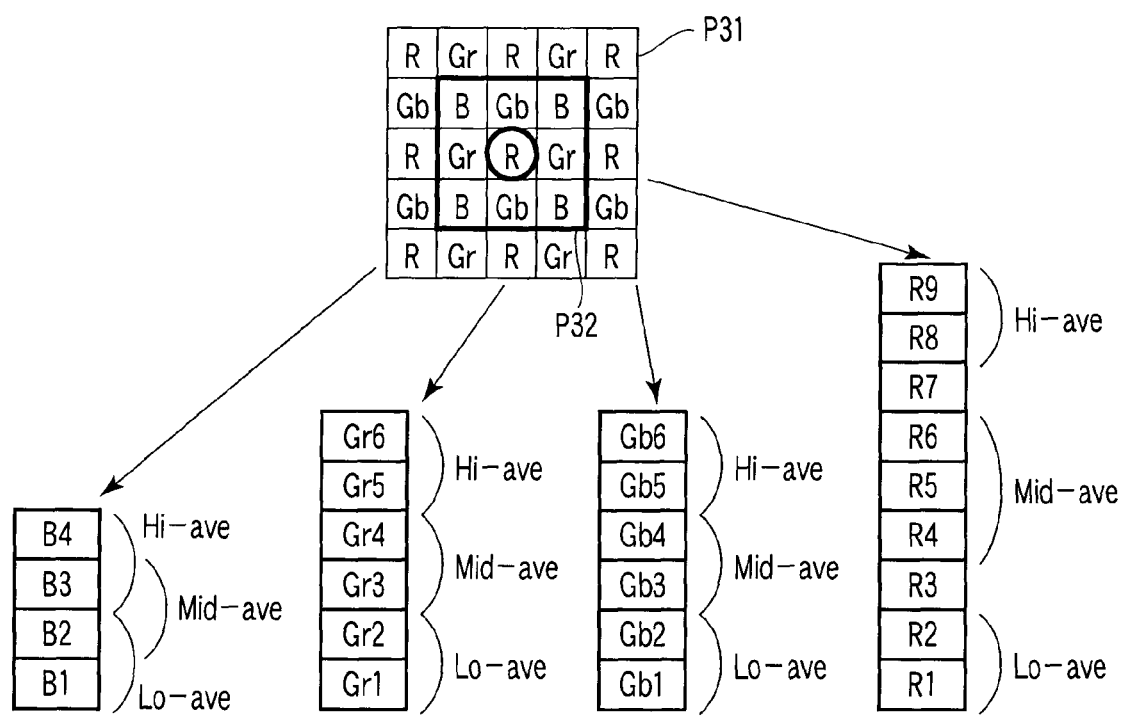
F I G. 8

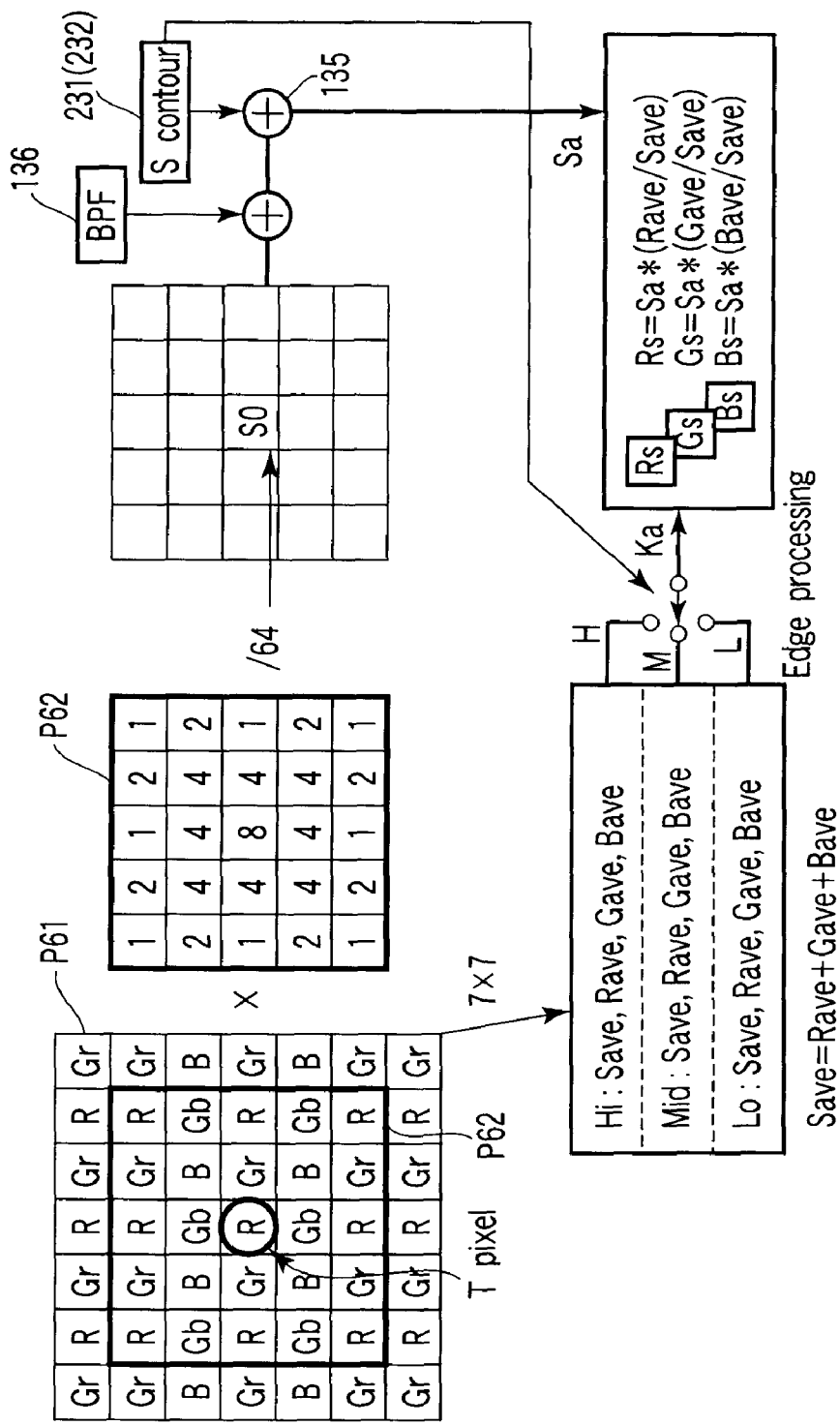
F I G. 11

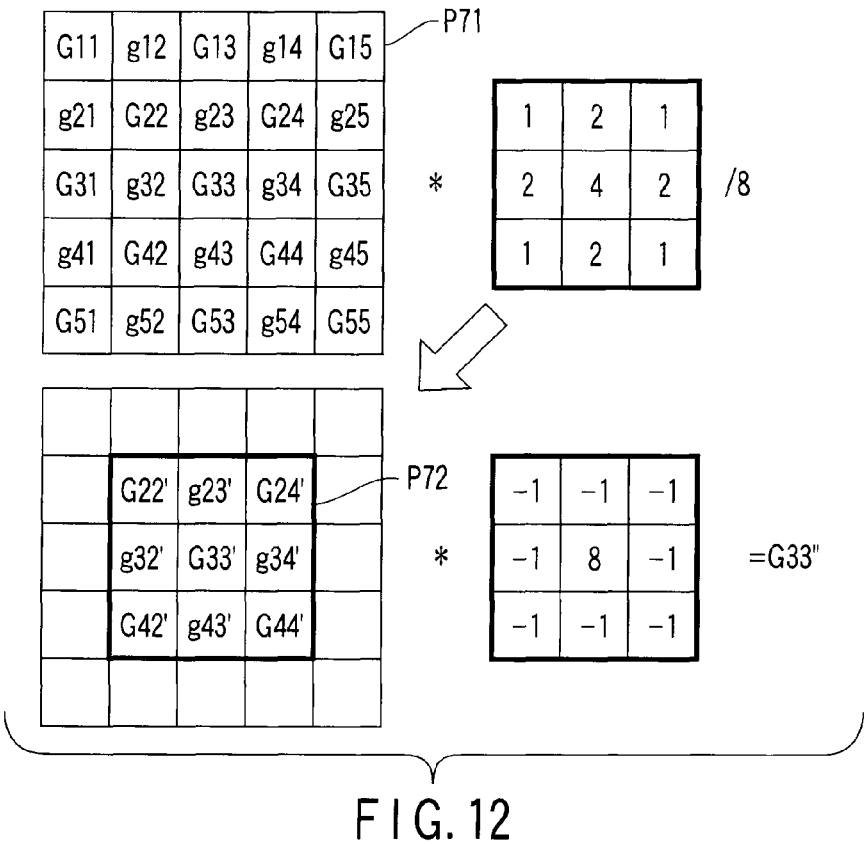
F I G. 12
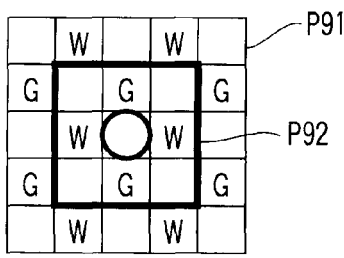
F I G. 15A
Wave=(W+W+W+W+W+W)/6
Gave=(G+G+G+G+G+G)/6
Kgw=Gave/Wave
F I G. 15B
WHave=(W5+W6)/2
GHave=(G5+G6)/2
KgwH=GHave/WHave
WLave=(W1+W2)/2
GLave=(G1+G2)/2
KgwL=GLave/WLave
F I G. 15C

IMAGING SIGNAL PROCESSING APPARATUS

CROSS-REFERENCE TO RELATED APPLICATIONS

This application is based upon and claims the benefit of priority from prior Japanese Patent Application No. 2007-134567, filed May 21, 2007, the entire contents of which are incorporated herein by reference.

BACKGROUND OF THE INVENTION

1. Field of the Invention

The present invention relates to an image signal processing apparatus, and particularly to signal processing means for producing an RGB signal by an RGB color ratio correlation. For example, the signal processing means is used for a solid-state imaging device such as a charge-coupled device (CCD) image sensor and CMOS image sensor, an image sensor built-in portable telephone, a digital camera, and a video camera.

2. Description of the Related Art

Recently, with finer pixels in an image sensor, a 2-μm order pixel is put into practical use, and a 1.75-μm pixel and a 1.4-μm pixel are being developed. In the pixel of not more than 2 μm, the incident light quantity is greatly decreased, causing the signal-to-noise ratio (S/N) to deteriorate. Additionally, in a conventional color camera, there is a problem in that image quality is caused to deteriorate by false color signal or color noise. There have been proposed various methods for suppressing the false color signal or reducing the noise (for example, see Jpn. Pat. Appln. KOKAI Publication Nos. 4-235472, 2002-10108, 2005-303731, 2001-245307, and 5-168029). However, there is proposed no effective countermeasure against the problem.

For example, in a single-plate color camera, an RGB color shift in which the false color is generated in an edge portion of a subject image or random noise of each of the RGB signals generates dot-shaped color noise to thereby cause the image quality to deteriorate.

There are two factors that generate the false color signal. First, beat noise is generated near a critical resolution of a sensor because of a mismatch between the pixel pitch and a high-resolution pattern of a subject, and a frequency of the input signal is folded back toward a low frequency to generate the false color signal. Second, refractive indexes of the RGB light beams differ from one another because of a difference in wavelength of the RGB light beams incident to an optical lens, thereby generating magnification chromatic aberration in which RGB images are shifted from one another in a surrounding area.

As shown in FIG. 18, the magnification chromatic aberration is particularly increased in an end portion of a pixel area. Furthermore, in order to correspond to the fine pixel, as shown in FIG. 19, when the F value is decreased while the spatial frequency is increased, on-axis chromatic aberration is increased even at the center of the screen because of a difference in decrease of the modulated transfer function (MTF). Therefore, the image quality deteriorates remarkably in the fine pixel.

BRIEF SUMMARY OF THE INVENTION

According to a first aspect of the present invention, there is provided an image signal processing apparatus comprising:

a sensing section which includes two-dimensionally arranged red (R), green (G), and blue (B) pixels formed of photoelectric conversion elements which convert an image signal to a charge signal and R, G, B filters, respectively, and produces R, G, and B color signals of R, G, and B color components of the image signal;

a first adding section which adds, while weighting pixels in a predetermined ratio, a color signal of a center pixel of a predetermined pixel arrangement within the two-dimensionally arranged pixels and color signals of a plurality of peripheral pixels surrounding the center pixel within the two-dimensionally arranged pixels to produce a first addition signal;

a contour signal generating section which generates a contour signal from the color signals before being added by the first adding section;

a second adding section which adds the contour signal generated by the contour signal generating section to the first addition signal produced by the first adding section to produce a second addition signal;

a ratio coefficient calculation section which calculates a ratio coefficient of an average value of the R, G, and B color signals of the pixels in units of a color within the predetermined pixel arrangement to a sum-up value of the average values; and an RGB signal generating section which generates new R, G, and B signals using the ratio coefficients calculated by the ratio coefficient calculation section and the first or second addition signal.

According to a second invention, there is provided an image signal processing apparatus comprising:

a sensing section which includes two-dimensionally arranged red (R), green (G), and blue (B) pixels formed of photoelectric conversion elements which convert an image signal to a charge signal and R, G, B filters, respectively, and produces R, G, and B color signals of R, G, and B color components of the image signal;

a first adding section which adds, while weighting pixels in a predetermined ratio, a color signal of a center pixel of a predetermined pixel arrangement within the two-dimensionally arranged pixels and color signals of a plurality of peripheral pixels surrounding the center pixel within the two-dimensionally arranged pixels to produce a first addition signal;

a contour signal generating section which generates a contour signal from the G color signal;

a second adding section which adds the contour signal generated by the contour signal generating section to the first addition signal produced by the first adding section to produce a second addition signal;

a ratio coefficient calculation section which calculates a ratio coefficient of an average value of the R, G, and B color signals of the pixels in units of a color within the predetermined pixel arrangement to a sum-up value of the average values; and an RGB signal generating section which generates new R, G, and B signals using the ratio coefficients calculated by the ratio coefficient calculation section and the first or second addition signal.

According to a third invention, there is provided an image signal processing apparatus comprising:

a sensing section which includes two-dimensionally arranged red (R), green (G), and blue (B) pixels formed of photoelectric conversion elements which convert an image signal to a charge signal and R, G, B filters, respectively, and produces R, G, and B color signals of R, G, and B color components of the image signal;

an adding section which adds, while weighting pixels in a predetermined ratio, a color signal of a center pixel of a predetermined pixel arrangement within the two-dimensionally arranged pixels and color signals of a plurality of peripheral pixels surrounding the center pixel within the two-dimensionally arranged pixels to produce an addition signal;

a ratio coefficient calculation section which calculates a ratio coefficient of an average value of the R, G, and B color signals of the pixels in units of a color within the predetermined pixel arrangement to a sum-up value of the average values; and an RGB signal generating section which generates new R, G, and B signals using the ratio coefficients calculated by the ratio coefficient calculation section and the addition signal.

BRIEF DESCRIPTION OF THE SEVERAL
VIEWS OF THE DRAWING

FIG. 1 is a block diagram showing a schematic configuration of a lens-equipped CMOS image sensor which is an image signal processing apparatus according to a first embodiment of the present invention;

Figure 7:
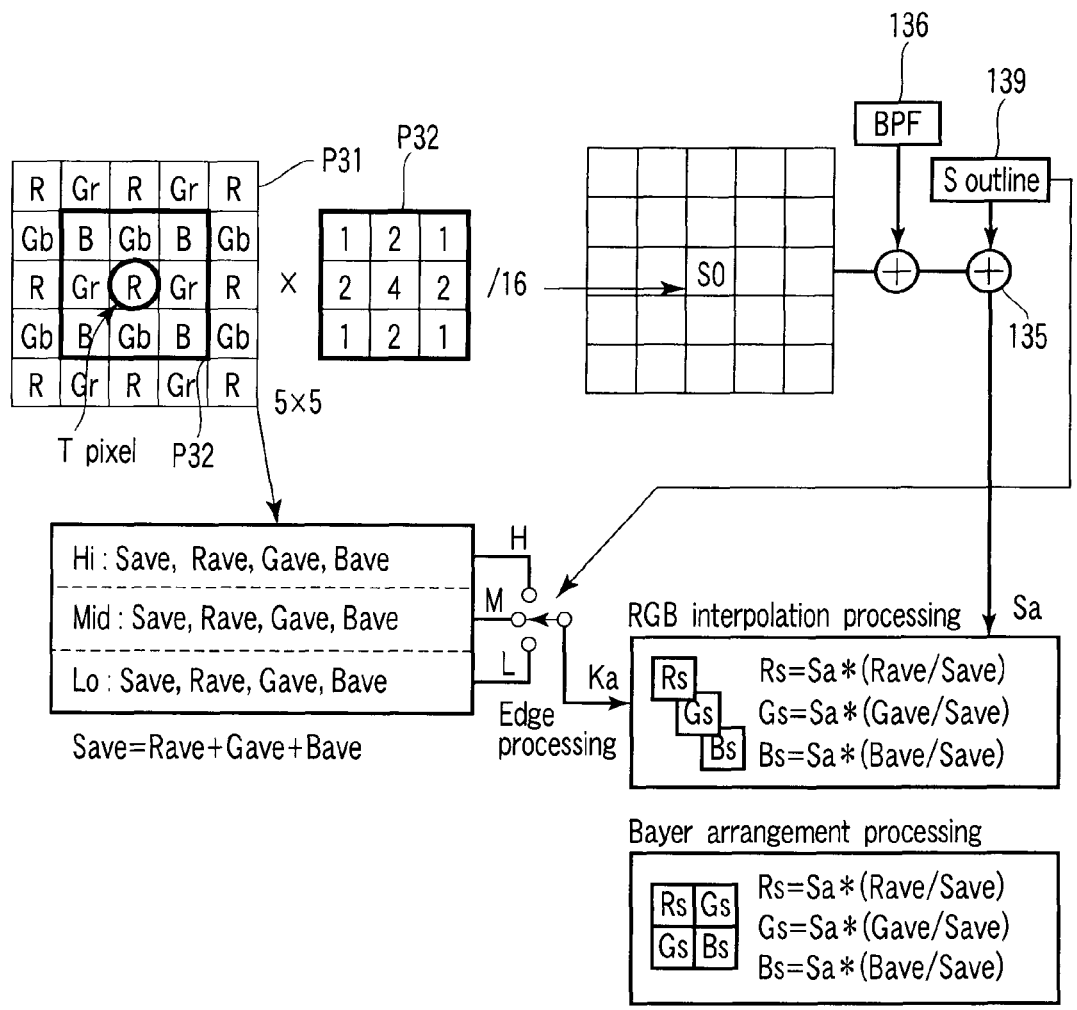
FIG. 7 shows an example of a processing method performed to an edge area of a subject in the color correlation RGB generating section of FIG. 1.
Figure 9:
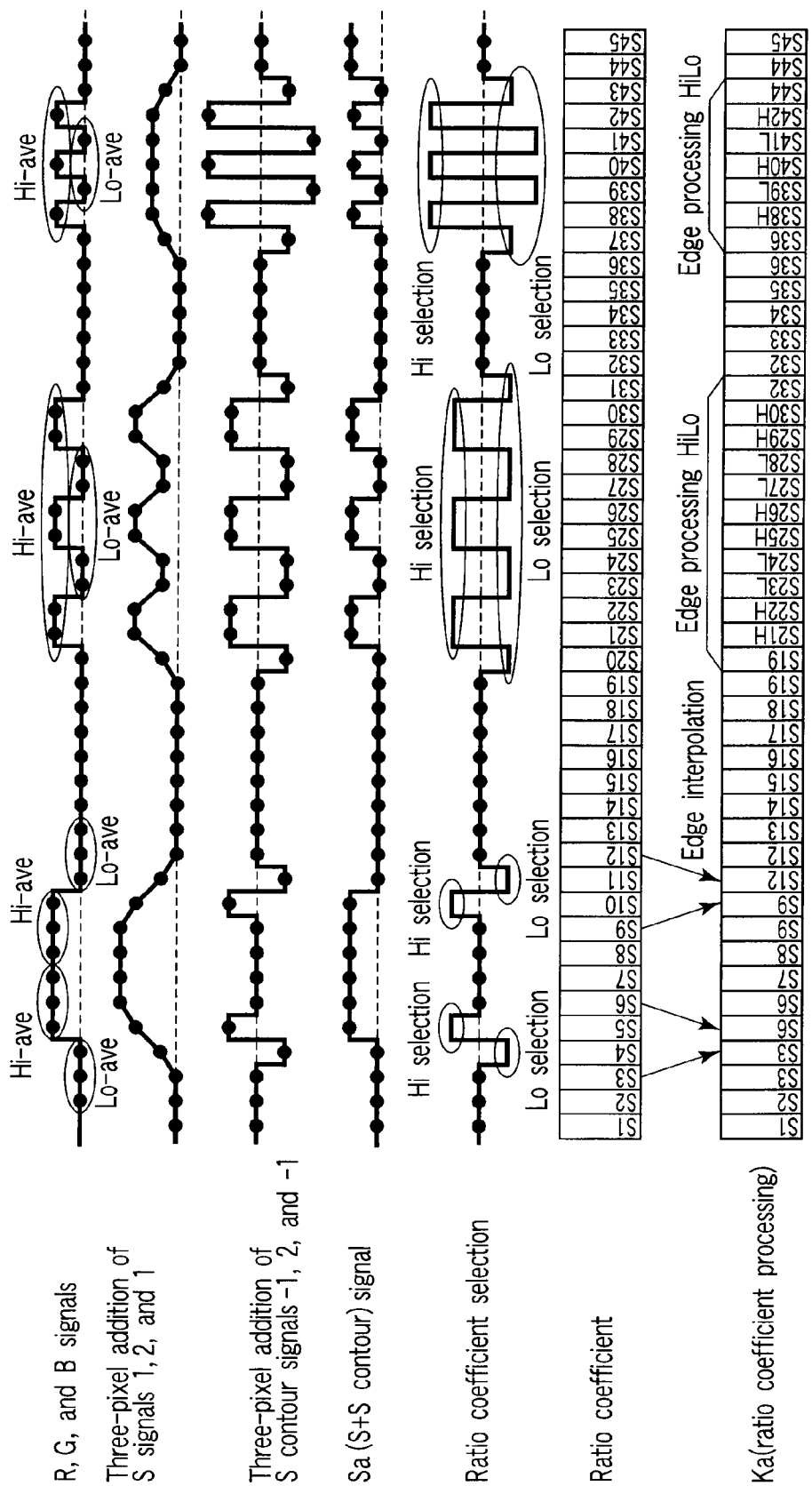
Figure 10:
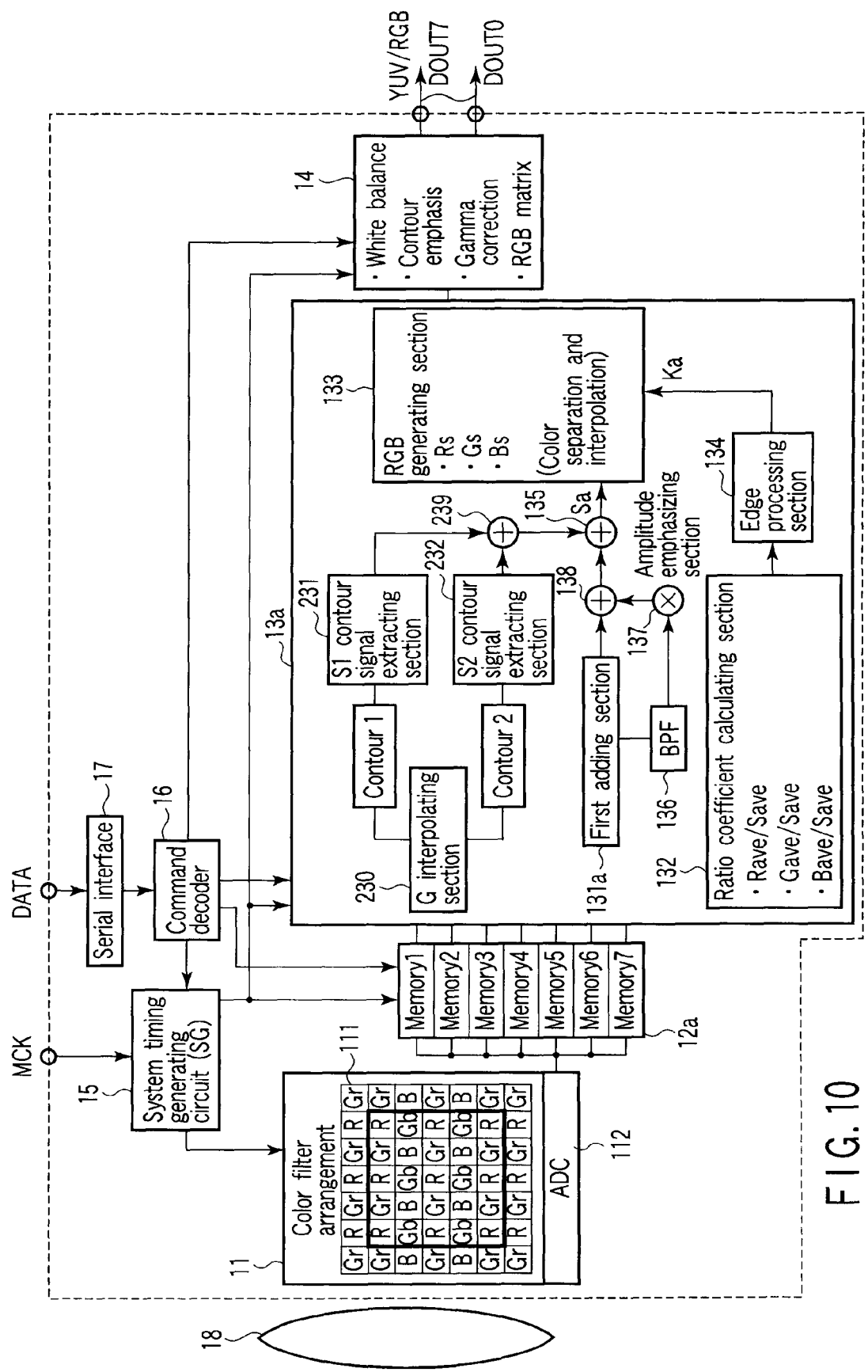
Figure 13:
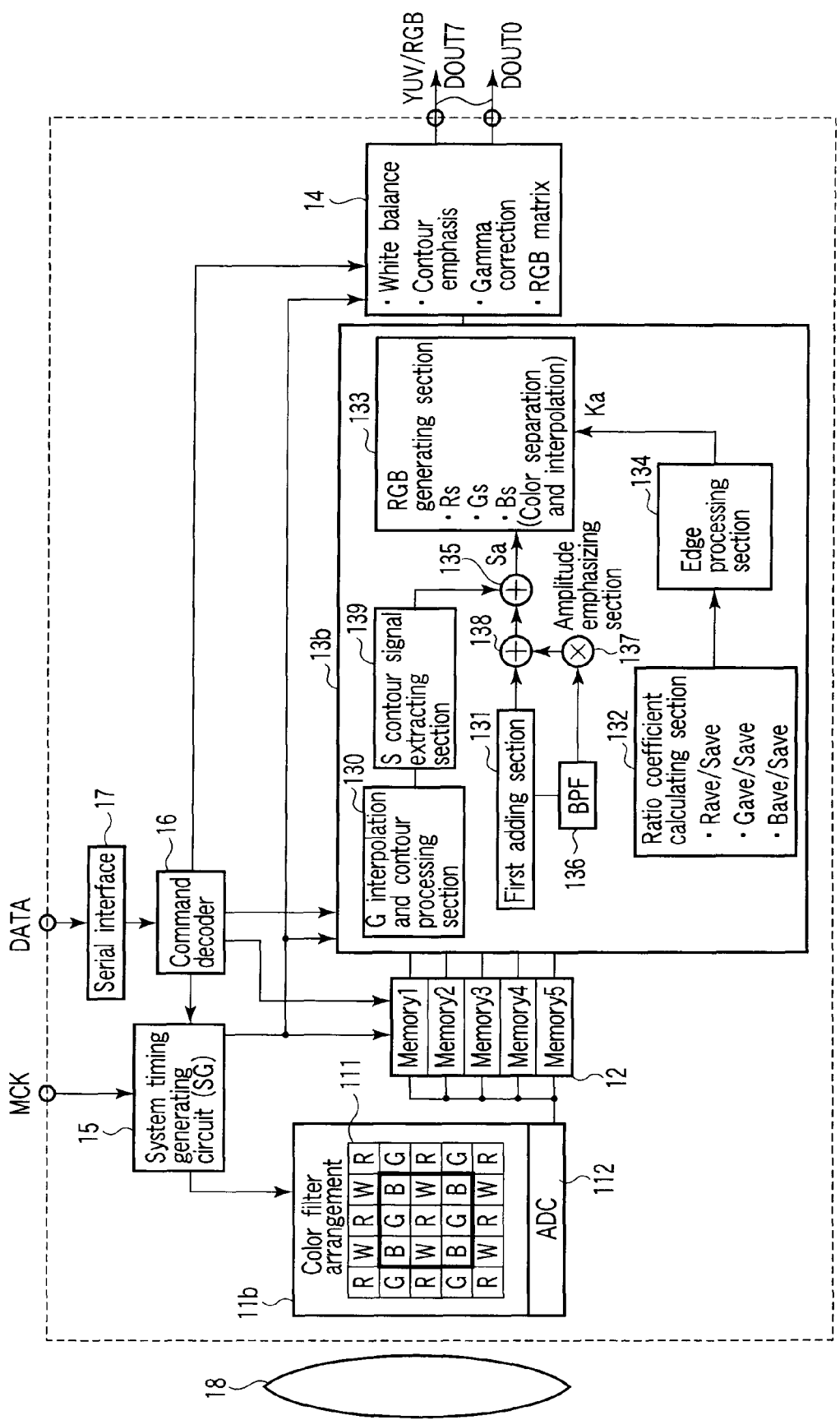
Figure 14:
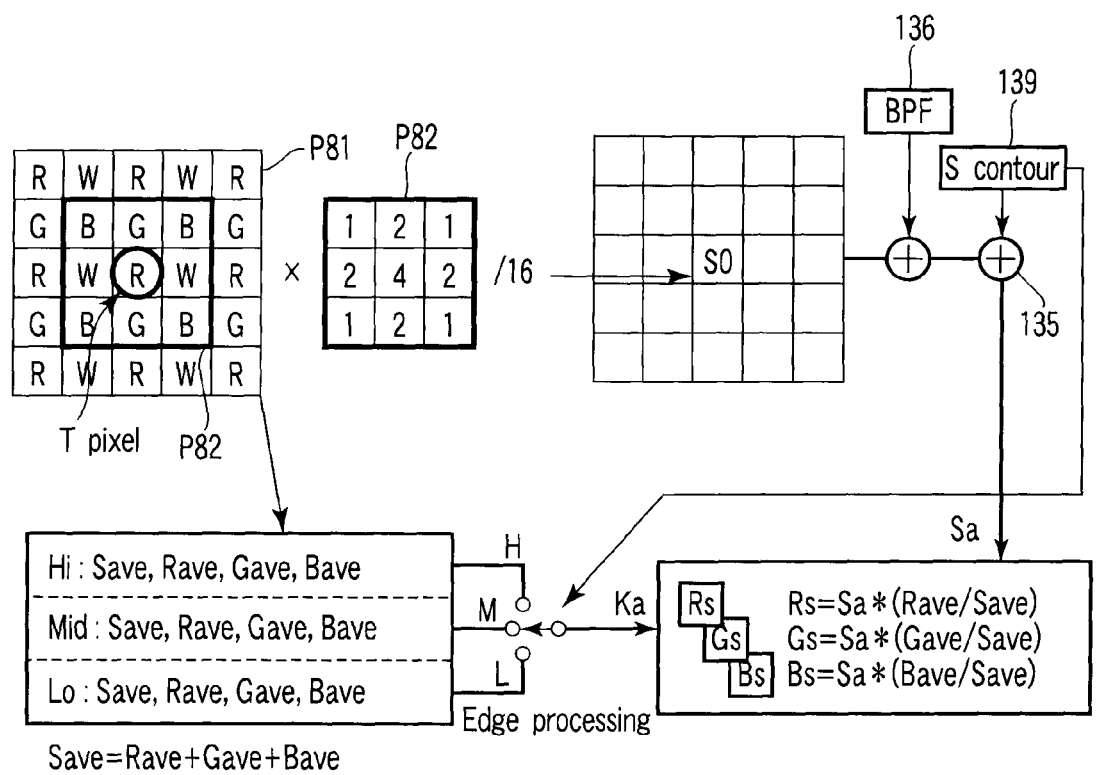
Figure 16:
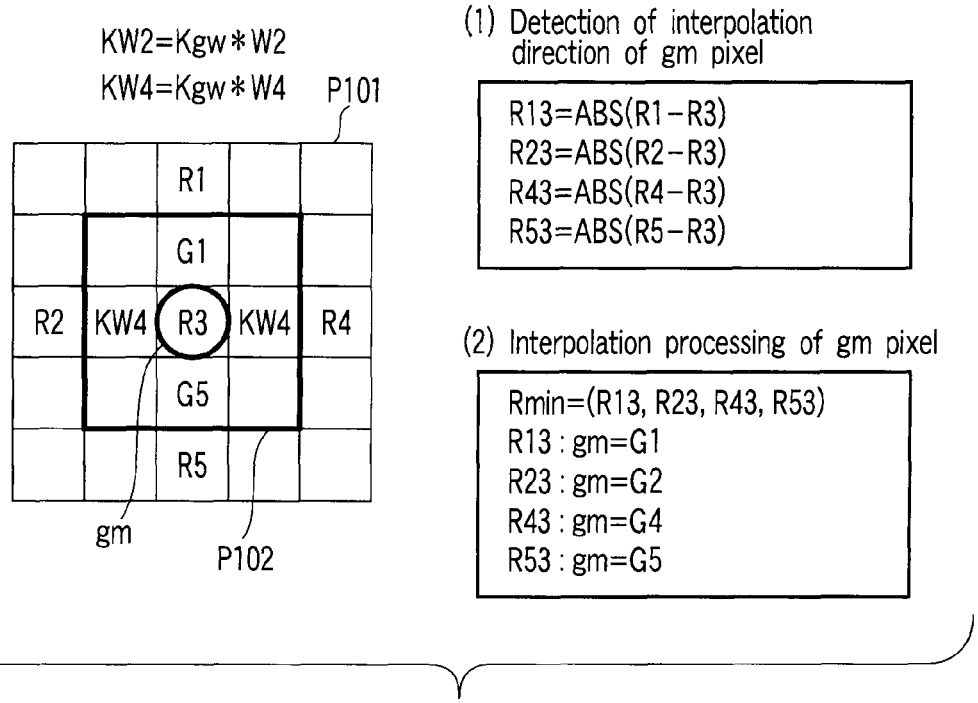
Figure 17:
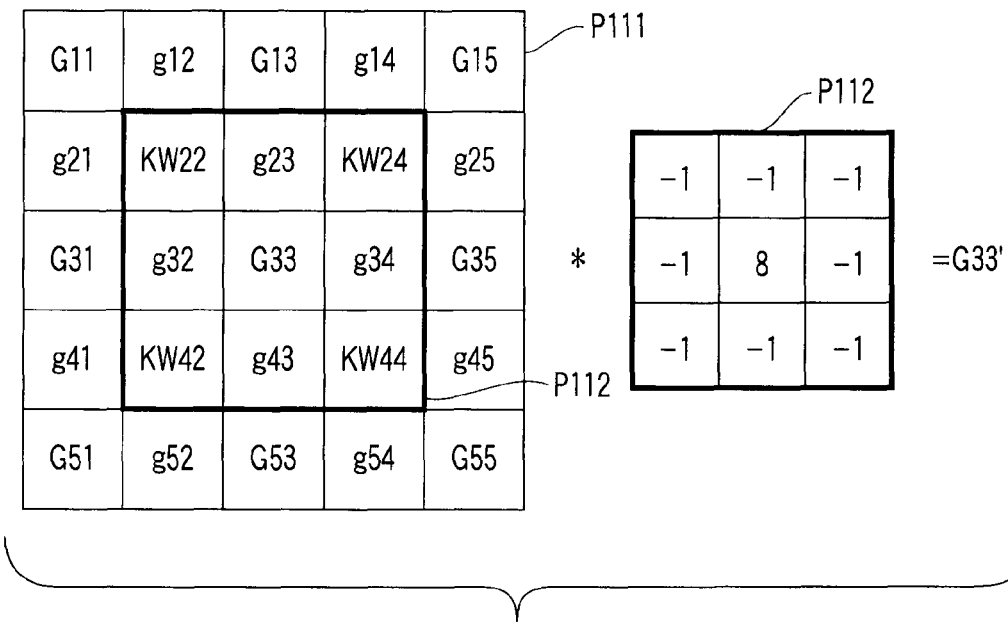
Figure 18:
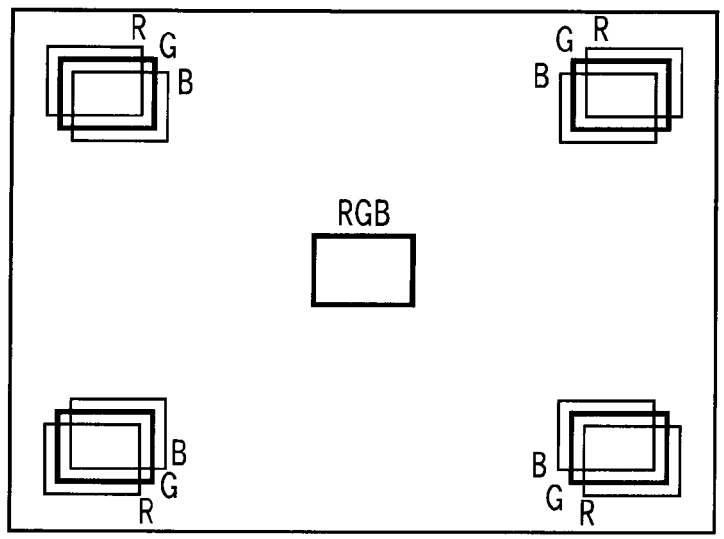
Figure 19:
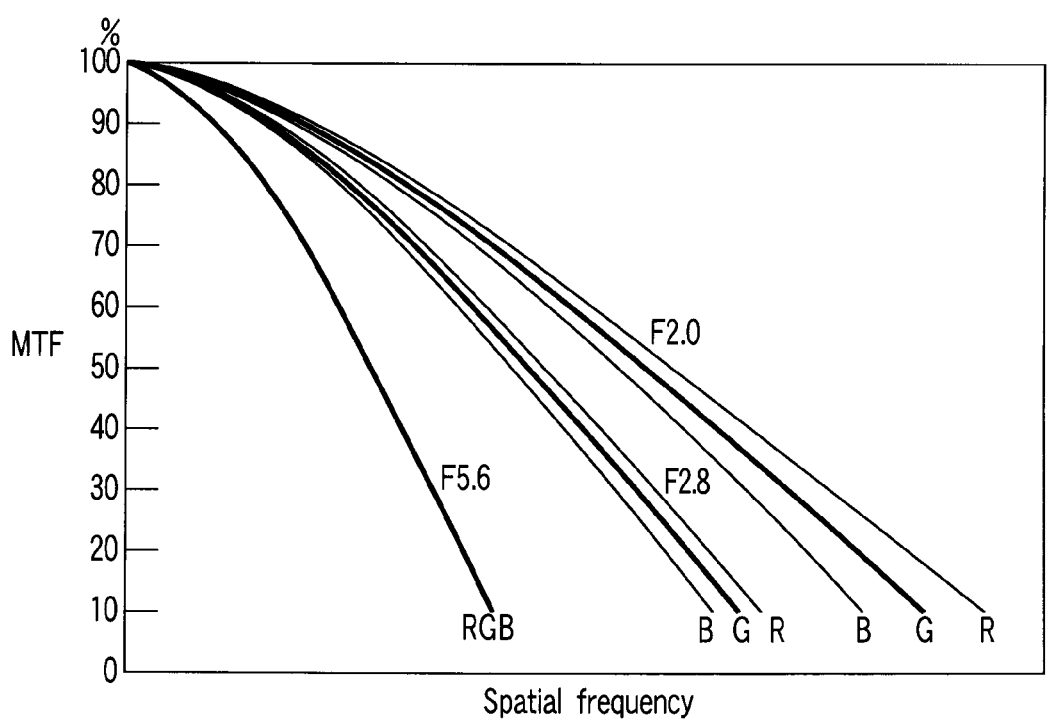

FIG. 8 partially shows the detailed processing method of FIG. 7;

FIG. 9 shows a signal processing flow in the CMOS image sensor of FIG. 1;

FIG. 10 is a block diagram showing a schematic configuration of a lens-equipped CMOS image sensor according to a second embodiment of the present invention;

FIG. 11 shows an example of a basic processing method in a color correlation RGB generating section of FIG. 10;

FIG. 12 shows an example of a method for generating a G contour signal in the color correlation RGB generating section of FIG. 10;

FIG. 13 is a block diagram showing a schematic configuration of a lens-equipped CMOS image sensor according to a third embodiment of the present invention;

FIG. 14 shows an example of a basic processing method in a color correlation RGB generating section of FIG. 13;

FIGS. 15A, 15B and 15C show diagrams for explaining an example of a pseudo-G signal generation processing method using a W signal and a G signal in the color correlation RGB generating section of FIG. 13;

FIG. 16 is a diagram for explaining an example of an interpolation processing method for generating the G signals at R and B pixel positions in the color correlation RGB generating section of FIG. 13;

FIG. 17 shows an example of a method for generating a G contour signal in the color correlation RGB generating section of FIG. 13;

FIG. 18 shows a state in which a magnification chromatic aberration caused by a lens of a solid-state imaging device is particularly increased around a pixel area; and FIG. 19 shows a state in which an on-axis chromatic aberration is increased even in a center of a screen with increasing spatial frequency in the case where an F value of the lens of the solid-state imaging device is decreased.

DETAILED DESCRIPTION OF THE INVENTION

Embodiments of the present invention will be described below. In the following embodiments, the invention is applied to a CMOS image sensor. In the following drawings, the same component is designated by the same reference numeral.

First Embodiment

FIG. 1 is a block diagram showing a schematic configuration of a lens-equipped CMOS image sensor according to a first embodiment of the invention. The CMOS image sensor includes a sensor section 11, a line memory 12, a color correlation RGB generating section 13, a signal processing circuit 14, a system timing generating circuit (SG) 15, a command decoder 16, and a serial interface 17. Reference numeral 18 denotes a lens, and a light signal collected by the lens 18 is fed into the sensor section 11 through the lens 18.

A sensor section 111 and a column-type analog-to-digital converter (ADC) 112 are disposed in the sensor section 11. The sensor section 111 has a photodiode array in which pixels are two-dimensionally arranged on a semiconductor substrate. Each of the pixels includes photoelectric conversion element (for example, a photodiode) and a color filter. Red (R), green (G), and blue (B) color filters are provided above the photodiode. It is assumed that an RGB primary Bayer arrangement is adopted as the color filter arrangement.

In the sensor section 11, an input light signal of a subject is separated into light signals of R, G, B components through the color filters, and the photodiode array produces a signal charge by photoelectric conversion. The column-type ADC 112 converts the signal charge into digital signals (R, G, and B signals) and outputs the digital signals. The signal output from the sensor section 11 is converted to digital signal via the ADC 111, and the digital signals are input to the line memory 12 and stored in a memory 1 to a memory 5 for five vertical lines. The signals stored in the memory 1 to memory 5 are fed in parallel into the color correlation RGB generating section 13.

The color correlation RGB generating section 13 includes a first adding section 131, a ratio coefficient calculation section 132, an RGB generating section 133, an edge processing section 134, a second adding section 135, a band-pass filter (BPF) 136, an amplitude emphasizing section 137, a third adding section 138, a G interpolation and contour processing section 130, and a contour signal extraction section 139.

The first adding section 131 produces a first addition signal S based on the signals (R, G, and B signals) fed in parallel from the line memory 12. The ratio coefficient calculation section 132 calculates average ratio coefficients of the first addition signal S and each of the R, G, and B signals based on the color information on peripheral pixels of the to-be-added pixels. The RGB generating section 133 produces new signals Rs, Gs, and Bs which are signals at the same position as the pixel arrangement from the average ratio coefficient and the first addition signal S. The Rs, Gs, and Bs signals may be produced by the Bayer arrangement. The processing of the first embodiment can serve as the processing performed by the conventional color separation interpolating circuit, and suppresses the color shift or color noise of the edge portion.

The Rs, Gs, and Bs signals processed by the RGB generating section 133 are fed into the signal processing circuit 14. In the signal processing circuit 14, the Rs, Gs, and Bs signals are processed by a white balance circuit, contour emphasizing circuit, gamma (γ) correction circuit, and RGB matrix circuit and the like and output as digital signals DOUT0 to DOUT7 in a YUV signal format or an RGB signal format. The sensor section 11, line memory 12, color correlation RGB generating section 13, and signal processing circuit 14 are operated based on a clock signal supplied from the system timing generating circuit (SG) 15. At this point, a processing parameter of each circuit may be controlled by a command. For example, data DATA from the outside is fed into the command decoder 16 through the serial I/F 17, and the decoded signal is fed into each circuit, whereby the processing parameter can be controlled by the data DATA fed from the outside.

In the first adding section 131, signals of at least four pixels (for example, nine pixels of 3×3 pixel arrangement) of the signals fed in parallel from the line memory 12 are added to produce the first addition signal S. However, the first addition signal S does not contain a high-frequency component, and thus, the edge portion is gentle. Then, in parallel with the addition processing performed by the first adding section 131, the G interpolation and contour processing section 130 performs G interpolation processing and contour processing to the signals before the signals are added. Further, in the S contour signal extraction section 139, an S contour signal from which noise components are removed is extracted from the G interpolation processed and contour processed signal. In the second adding section 135, the S contour signal is added to the first addition signal S to produce a second addition signal Sa.

In order to improve a resolution of the first addition signal S, it is preferable that the band-pass filter (BPF) 136 extracts the intermediate frequency from the first addition signal S, and the second adding section 135 adds the intermediate frequency to the first addition signal S after the amplitude emphasizing section 137 performs the amplitude emphasis.

In calculating the average ratio coefficient, the color reproduction is possibly caused to deteriorate by an error of the ratio coefficient at a signal switching edge. In order to suppress the deterioration, the ratio coefficient of the signal fed from the line memory 12 is calculated while separated into a large (Hi) level, an medium (Mid) level, and a small (Lo) level, and the edge processing section 134 selects the Hi-level or Lo-level of the ratio coefficient to produce new R signal, G signal, and B signal. The selection of the ratio coefficient is performed based on the S contour signal.

Figure 2:
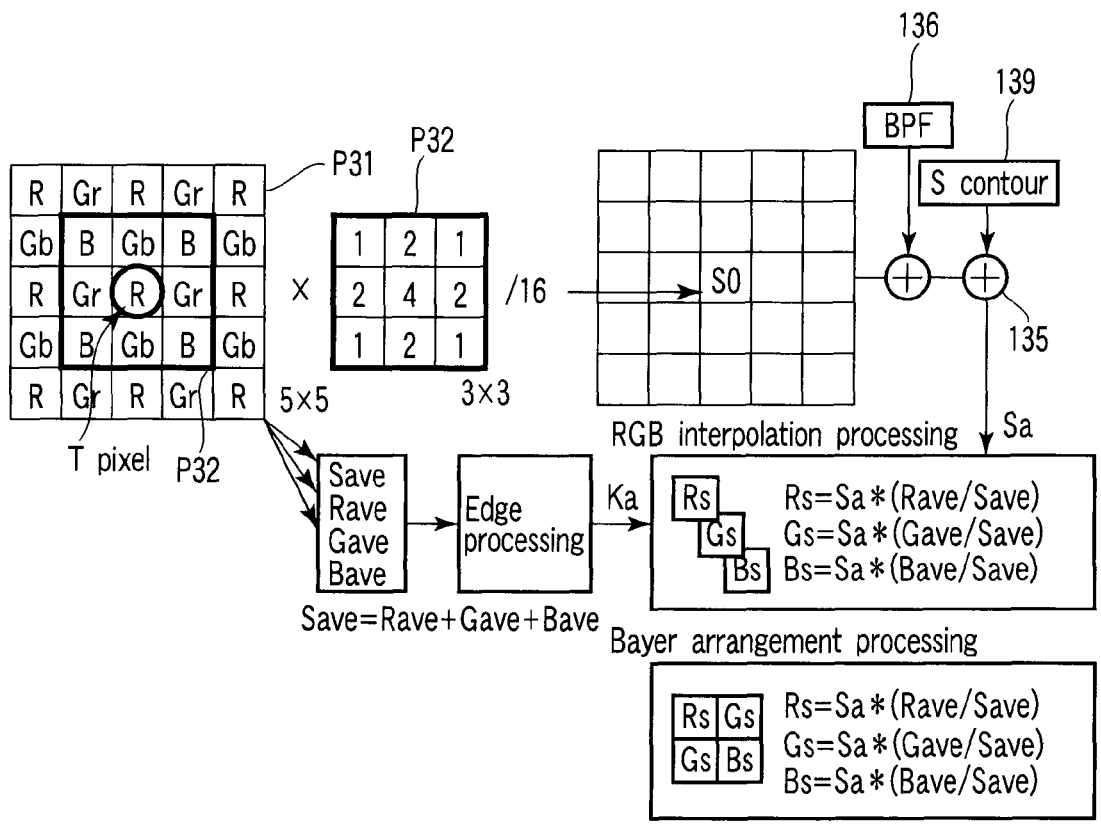
FIG. 2 shows an example of a basic processing method in a color correlation RGB generating section of FIG. 1.

FIG. 2 shows an example of a basic processing method in the color correlation RGB generating section 13 of FIG. 1. Filtering calculation of the 3×3 pixel arrangement P32 is performed around a center pixel (T pixel) of a 5×5 pixel arrangement P31. At this point, in the 3×3 pixel arrangement P32, the signal of the T pixel is multiplied by 4, the signals of the pixels vertically and horizontally adjacent to the T pixel are multiplied by 2, the signals of the pixels at corner portions of the 3×3 pixel arrangement P32 are multiplied by 1 (one), and a signal level of the sum of all of the signals is multiplied by 1/16. It is assumed that an addition signal S0 of the T pixel is the signal obtained in the above-described manner. Then, an Sa signal is produced by adding the signal from BPF 136 and the S contour signal to the addition signal S0.

Then, the ratio coefficient calculation section 132 calculates average values Rave, Gave, and Bave of the pixel signals having the same color in the signals of the 5×5 pixel arrangement P31 formed of a RGB Bayer arrangement. Further, the ratio coefficient calculation section 132 produces an addition signal Save=Rave+Gave+Bave, that is, an addition signal Save attained by adding the average values Rave, Gave and Bave. The edge processing section 134 detects the signal (edge signal) of the edge portion in the subject image to perform edge processing. In the edge processing section 134, the average of all the signals having the same color in the 5×5 pixel arrangement P31 is not used as the ratio coefficient. Rather, the ratio coefficients of the R signal, G signal, and B signal are calculated while separated into the large, medium, and small levels, and the ratio coefficient calculated according to the large level or small level is used in the edge area of the signal while the ratio coefficient calculated according to the medium level is used in a flat area of the signal.

Using the addition signal Sa and three ratio coefficients Ka (="Rave/Save", "Gave/Save", and "Bave/Save") corresponding to the addition signal Sa, the RGB generating section 133 generates new signals Rs, Gs, and Bs from the following equations:

$$Rs=Sa\times(Rave/Save) \tag{1}$$

$$Gs=Sa\times(Gave/Save) \tag{2}$$

$$Bs=Sa\times(Bave/Save) \tag{3}$$

According to the present first embodiment, even if the random noise caused by the single pixel exists in the signal of each pixel, the first addition signal S is produced for the 3×3 pixel arrangement P32 and the random noise is reduced in the first addition signal S, so that the S/N can be improved. The Rs, Gs, and Bs signals are produced as pixel signals at the same positions as the 3×3 pixels P32 from the first addition signal S, so that the random noise components of the Rs, Gs, and Bs signals become identical to one another. Accordingly, a false color suppression circuit for de-mosaic is unnecessary to suppress the false color caused by the edge. That is, because only brightness noise is generated, the monochrome color noise can be suppressed.

Because the Rs, Gs, and Bs signals are produced from the one addition signal S, even if subtraction processing is performed on the signals through color matrix calculation to produce new R, G, B signals for the purpose of improving the color reproduction, the random noise included in the new R, G, B signals becomes the same phase and the noise is not increased.

Further, a signal whose amplitude is emphasized by the midrange frequency component of the first addition signal S by the amplitude emphasizing section 137 is added to the first addition signal S, so that the resolution is improved.

Figures 3A, 3B:
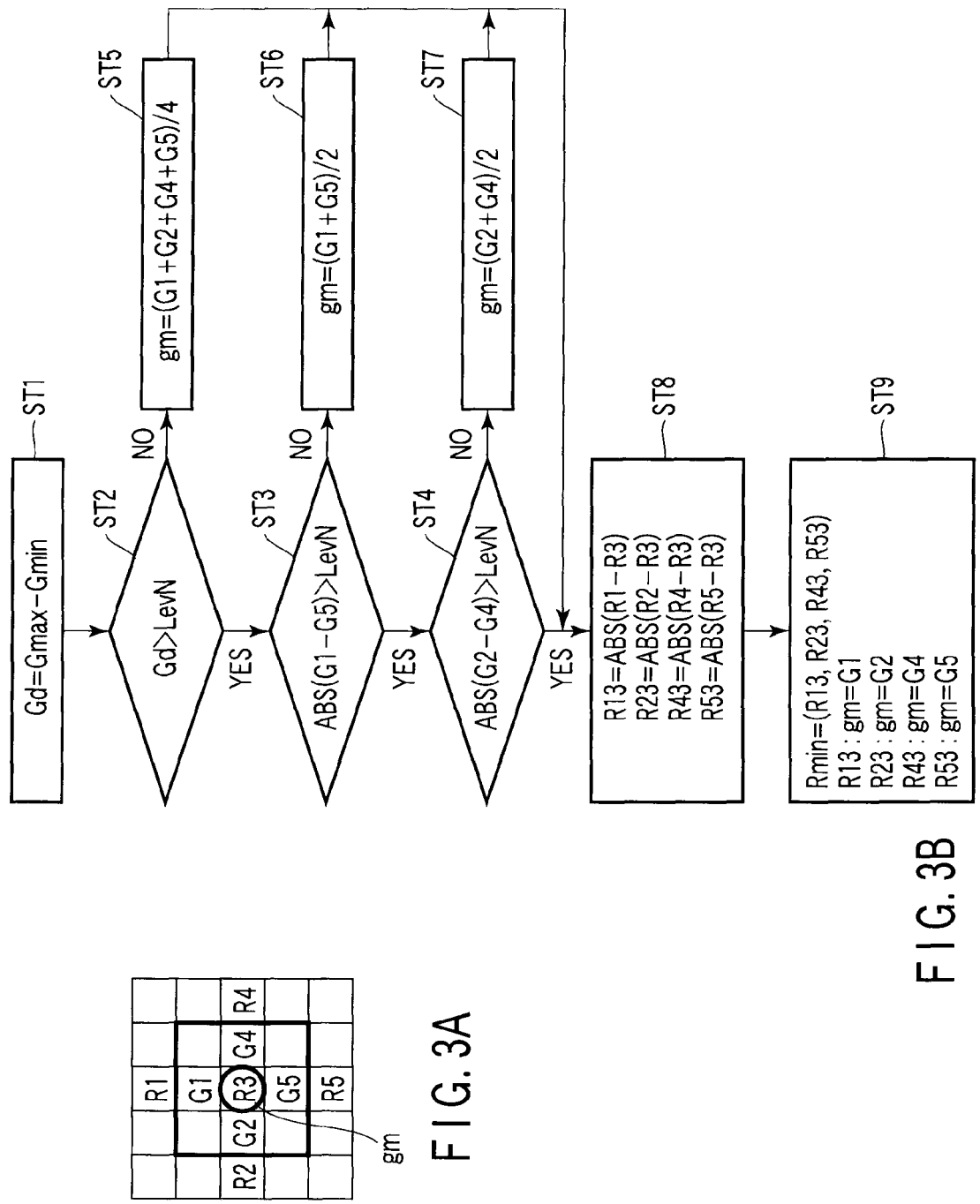
FIGS. 3A and 3B show diagrams for explaining an example of a method for performing interpolation processing to a G signal in the color correlation RGB generating section of FIG. 1.

FIGS. 3A and 3B show diagrams for explaining an example of a method for performing interpolation processing to the G signal in the color correlation RGB generating section 13 of FIG. 1. FIG. 3A shows a 3×3 pixel arrangement of the sensor section shown in FIG. 1, and FIG. 3B shows an operation flow chart of the G interpolation processing circuit 130 performing interpolation processing to the G signal in the color correlation RGB generating section 13 of FIG. 1. The G signals are produced at the R and B pixel positions respectively. An example in which an interpolating G signal gm is produced at a position of an R3 pixel (to be interpolated) which is located in the center position of the 3×3 pixel arrangement will be described below. A maximum value (Gmax) and a minimum value (Gmin) of the signals of four G pixels (=G1, G2, G4, and G5 pixels) adjacent to the R3 pixel are first determined, and at step ST1, a difference signal Gd (=Gmax−Gmin) is acquired. At step ST2, the difference signal Gd is compared to a predetermined determination level LevN. When the difference signal Gd is lower than the determination level LevN, at step ST5, an average (G1+G2+G4+G5)/4 of the four G signals is produced as the G signal gm. It is assumed that the determination level LevN is the random noise level. When the difference signal Gd is greater than the determination level LevN, an absolute value ABS(G1−G5) of a difference between signals of G1 and G5 pixels adjacent to the R3 pixel in a vertical direction is compared at step ST3 to the determination level LevN. When the absolute value ABS(G1−G5) is lower than the determination level LevN, at step ST6, an average (G1+G5)/2 of the signals of the G1 and G5 pixels is calculated and an interpolation is performed using the average (G1+G5)/2. On the other hand, when the absolute value ABS(G1−G5) is lager than the determination level LevN, the process goes to step ST4, and at step ST4, an absolute value ABS(G2−G4) of a difference between signals of G2 and G4 pixels adjacent to the R3 pixel in a lateral direction is compared to the determination level LevN. when the absolute value ABS(G2−G4) is lower than the determination level LevN, at step ST7, an average (G2+G4)/2 of the signals of the G2 and G4 pixels is generated and calculated and an interpolation is performed using the average (G2+G4)/2. In the case of no correlation in the vertical and lateral directions of the R3 pixel, the process goes to step ST8, and absolute values ABS(R1−R3)=R13, ABS(R2−R3)=R23, ABS(R4−R3)=R43, and ABS(R5−R3)=R53 of differences between the signal of the R3 pixel and the signals of the R1, R2, R4, and R5 pixels around the R3 pixel are calculated. At step ST8, pixel position (minimum pixel position) where the difference signal becomes the minimum Rmin is obtained from the result of the four absolute values (R13, R23, R43, and R53) of the difference signals. The signal of the pixel in the same direction as the minimum pixel position is used as the G signal gm. For example, in the case where the difference between the signal of the R2 pixel and the signal of the R3 pixel becomes the minimum in the R1, R2, R4, and R5 pixels around the R3 pixel, the interpolation is performed using the signal of the G2 pixel located in the middle between the R2 pixel and the R3 pixel. Thus, the high-resolution G signal gm can be interpolated.

In the case where all the four absolute values (R13, R23, R43, and R53) of the difference signals are lower than the determination level LevN, the S/N can be improved by performing the interpolation using the average (G1+G2+G4+G5)/4 of the four G signals. The G interpolation processing method can be applied to other than the example.

Figure 4:
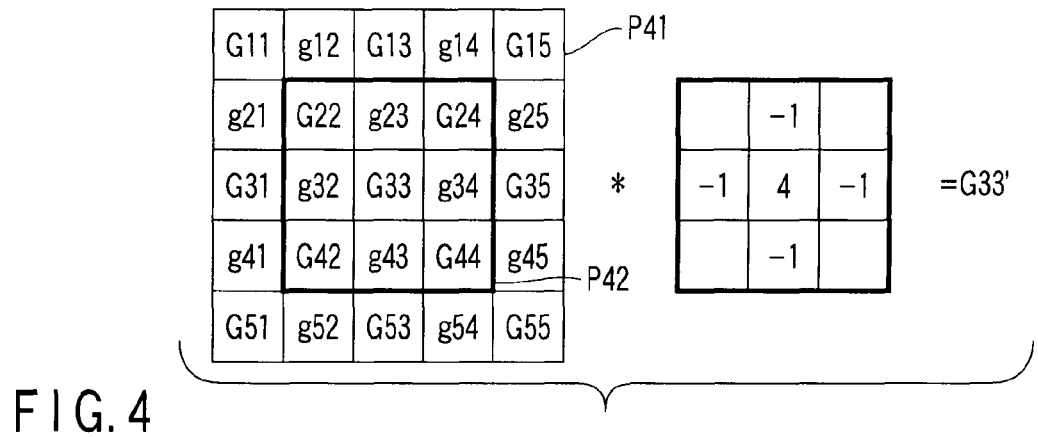
FIG. 4 shows an example of a method for generating a G contour signal in the color correlation RGB generating section of FIG. 1.

FIG. 4 shows an example of the method for generating the G contour signal in the color correlation RGB generating section 13 of FIG. 1. As shown in FIG. 3, the G contour signal is produced using the G signal produced for the purpose of the interpolation. For example, for a G33 pixel located in the center of the 3×3 pixel arrangement P42 within a 5×5 arranged pixels P41, the signal of the G33 pixel is multiplied by 4, and the signals of g23, g32, g34, and g43 pixels are multiplied by −1 and added to form a signal G33' as the G contour signal. The G contour signal G33' is not generated (zero) in an even subject, but is generated in the case where a vertical-striped or horizontal-striped pattern is generated.

Figure 5:
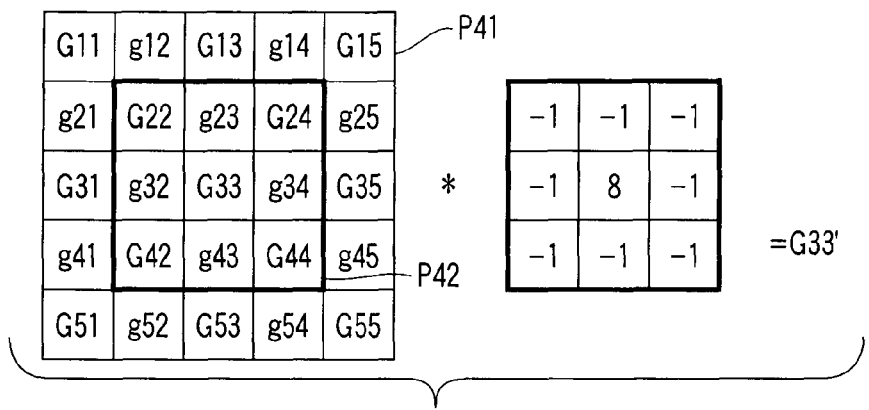
FIG. 5 shows another example of the method for generating the G contour signal in the color correlation RGB generating section of FIG. 1.

FIG. 5 shows another example of the method for generating the G contour signal in the color correlation RGB generating section 13 of FIG. 1. For example, for the G33 pixel located in the center of the 3×3 pixel arrangement P42 within a 5×5 arranged pixels P41, the signal of the G33 pixel is increased by a factor of 8, and the signals of G22, g23, G24, g32, g34, G42, g43, and G44 pixels are decreased by a factor of −1 and added to form the signal G33' as the G contour signal. The G contour signal G33' is not generated in an even subject, however, is generated in the case where the vertical-striped or horizontal-striped pattern is generated. The method for generating the G contour signal can be applied to other methods.

Figure 6A:
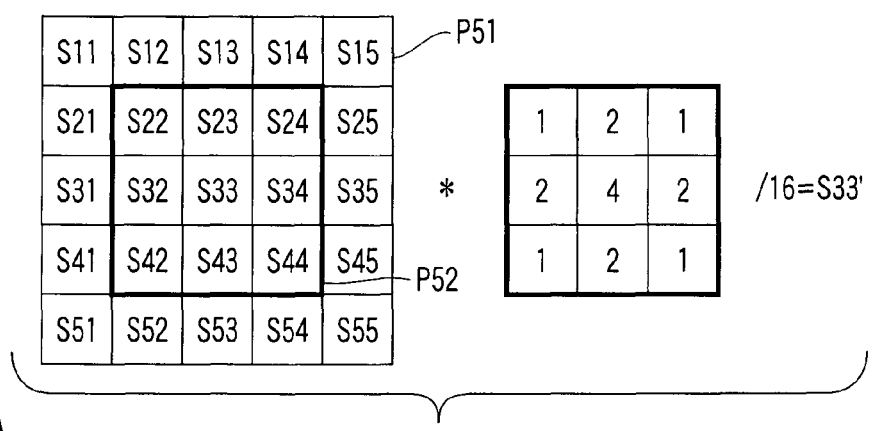
FIGS. 6A and 6B show examples of a method for emphasizing a midrange signal amplitude of a first addition signal S in the color correlation RGB generating section of FIG. 1.
Figure 6B:
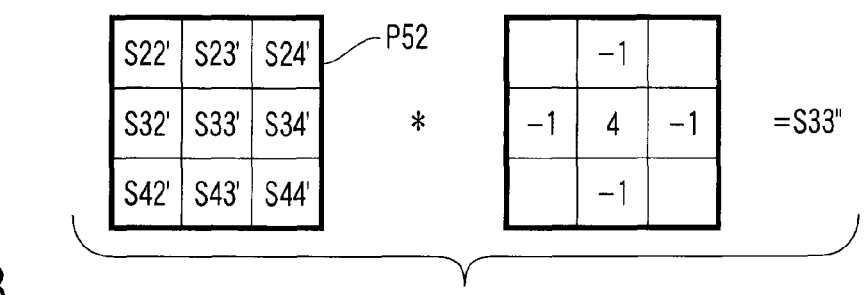

FIGS. 6A and 6B show examples of a method for enlarging (emphasizing) the intermediate (midrange) frequency signal amplitude of the first addition signal S in the color correlation RGB generating section 13 of FIG. 1.

FIG. 6A shows a method for extracting the midrange signal from the first addition signal S with the BPF processing. For example, a signal S33 of the center pixel of the 5×5 pixel area P51 is multiplied by a coefficient corresponding to each pixel of the 3×3 pixel area P52. Then, the addition is performed to the signal such that the signal level becomes equal before and after the addition, after which the signal is multiplied by 1/16 to form a new signal S33' of the center pixel.

FIG. 6B shows a method for producing the signals by similarly processing the pixels of the 3×3 pixel area P52 in the 5×5 pixel area. The contour extraction processing similar to that of FIG. 3 is performed to the signal generated by the method of FIG. 6, thereby extracting a midrange signal S33". The signal S33" is added to or subtracted from the original first addition signal S while the amplitude emphasizing section 137 of FIG. 1 controls the amplitude. Therefore, the amplitude of the midrange frequency is increased to improve the resolution. Thus, in the first embodiment, even if the amplitude emphasis is performed, the color reproduction is not changed because the color balance is separately performed by the calculation of the average ratio.

FIGS. 7 and 8 show examples of a processing method performed to an edge area (area where the signal obtained from the subject is rapidly changed) of a subject in the color correlation RGB generating section 13 of FIG. 1. In the edge area of the subject, the ratio coefficient is not simply obtained from the average of all the signals having the same color in the 3×3 pixel arrangement (area). First, rearrangement processing (for example, the rearrangement in ascending order) is performed to the ratio coefficients of the R, G, and B signals. The averages Rave, Gave, and Bave of the R, G, and B signals of the Hi-level two pixels or three pixels are calculated. Similarly, the averages Rave, Gave, and Bave of the R, G, and B signals of the Mid-level two pixels or three pixels are calculated. Similarly, the averages Rave, Gave, and Bave of the R, G, and B signals of the Lo-level two pixels or three pixels are calculated. As shown in FIG. 7, the average Save of the addition signal is calculated by adding the averages (Save=Rave+Gave+Bave) in each of the Hi level, Mid level, and Lo level. The number of pixels which becomes the processing target for the edge area is not limited to the two or three pixels.

The three ratio coefficients Ka (=Rave/Save, Gave/Save, and Bave/Save) corresponding to second addition signals Sa are calculated based on the averages Rave, Gave, and Bave and the average Save in which the averages Rave, Gave, and Bave are added. Then, the RGB generating section 133 produces new signals Rs (=Sa×Rave/Save), Gs (=Sa×Gave/Save), and Bs (=Sa×Bave/Save) using the ratio coefficients Ka and the second addition signals Sa. At this point, in the case where the S contour signal is in the Hi (positive) state, new Rs, Gs, and Bs signals are produced using the Hi-level ratio coefficients. In the case where the S contour signal is in the Lo (negative) state, new Rs, Gs, and Bs signals are produced using the Lo-level ratio coefficients. Thus, the Rs, Gs, and Bs signals are produced by calculating the Hi or Lo state of the S contour signal, whereby the generation of the false color signal can be suppressed in the edge area even if the resolution positions of the R, G, and B signals are shifted by the chromatic aberration.

FIG. 9 shows a signal processing flow in the CMOS image sensor of FIG. 1. For the purpose of easy understanding of a signal processing principle, signal waveforms in which one line of the signal waveforms is extracted so as to be supplied with the same phase are shown in the R, G, and B signals supplied from the sensor section. Filtering processing is performed to the signals while weighting of 1, 2, and 1 is performed in the horizontal direction, and the addition is performed to obtain the signal S in which the signal-to-noise ratio is improved. However, because the signal S has the gentle signal switching edge portion, a degree of modulation becomes zero and the signal change is hardly detected in the critical resolution area. Therefore, as described above with reference to FIGS. 4 and 5, the produced G contour signal is used as the S contour signal. The signal level of the S contour signal may be adjusted according to the resolution.

In FIG. 9, the filtering processing is performed to the G signal while the weighting of −1, 2, and −1 is performed in the horizontal direction, thereby generating the G contour signal (S contour signal). The S contour signal is added to the S signal to obtain the same high-resolution Sa signal as the original G signal. At this point, the addition is performed while the level of the S contour signal is increased, thereby obtaining the contour emphasis effect.

An example of a method for selecting the ratio coefficient of the edge area will be described below. The determination of the edge portion can be made in the case of the positive or negative S contour signal. The determination of not the edge portion can be made in the case where the S contour signal becomes zero. On the basis of the determination, the ratio coefficient having the Hi-level average (Hi-ave) is selected from the ratio coefficients calculated in FIG. 8 when the S contour signal becomes positive, the ratio coefficient having the Lo-level average (Lo-ave) is selected when the S contour signal becomes negative, and the ratio coefficient having the Mid-level average (Mid-ave) is selected when the S contour signal becomes zero. The determination of the absence of signal (zero) is made when the S contour signal is lower than a predetermined level. When the S contour signal is greater than the predetermined level, the determination of the presence of the contour signal is made to enable the positive or negative signal.

Alternatively, when the determination of the edge signal is made in the low-frequency edge area, the interpolation processing may be performed to the ratio coefficient calculated in FIG. 2 using the adjacent ratio coefficient.

Then, the Rs, Gs, and Bs signals are produced based on the Sa signal and the three coefficients Ka. As a result, the substantially original G signal is produced as the resolution information. The false color signal is not generated because the edges of the Bs and Rs signals have the same phase as the Gs signal. The random noise of the Rs, Gs, and Bs signals is correlated with the R, G, and B signals. That is, the R and B signals are increased when the G signal level is increased by the random noise, and the R and B signals are decreased when the G signal level is decreased by the random noise. Accordingly, the conventionally generated color noise (dot-shaped random noise) can be suppressed.

Second Embodiment

FIG. 10 is a block diagram showing a schematic configuration of a CMOS image sensor according to a second embodiment of the present invention. The improvement of the S/N is enabled in low illumination, and the configuration of the second embodiment differs from the configuration of the first embodiment in a line memory 12a and a color correlation RGB generating section 13a.

The different components will mainly be described below. In the line memory 12a, signals of perpendicular seven lines are stored in a memory 1 to a memory 7. The seven-line signals are fed in parallel into the color correlation RGB generating section 13a, and a first adding section 131a adds the RGB signals of the 5×5 pixels to produce the S signal. On the other hand, in order to correct edge blurring, a G interpolation section 230 performs the G interpolation processing, and an S1 contour signal extraction section 231 and an S2 contour signal extraction section 232 extract two kinds of contour signals (a contour signal S1 having the critical resolution frequency and a contour signal S2 having frequency half the critical resolution frequency) as the contour signal constituting the high-frequency component, from the G signal to which the G interpolation processing is performed. A fourth adding section 239 adds the S5 contour signal and the S2 contour signal, and the second adding section 135 adds the contour signal (S1+S2) to the S signal.

FIG. 11 shows an example of a basic processing method in the color correlation RGB generating section 13a of FIG. 10. The filtering calculation of the 5×5 pixel arrangement P62 is performed around the center pixel (T pixel) of a 7×7 pixel arrangement P61. At this point, in the 5×5 pixel arrangement P62, the signal of the T pixel is multiplied by 8, the signals of the peripheral pixels are multiplied by 4, 2, and 1, and these signals are added. Specifically, the signals of the eight pixels located in the vertical and horizontal portions and corner portions are multiplied by four in 3×3 pixel arrangement adjacent to the T pixel, the signals of the eight pixels located in the vertical and horizontal portions and corner portions are multiplied by 1 (one) in an end portion of the 5×5 pixel arrangement P62, and the signals of other eight pixels are multiplied by 2. Then, the signal level of the sum of these signals is multiplied by 1/64. The obtained signal is set to the addition signal S0 of the 5×5 pixel arrangement P62. Then, each of the S signal from BPF 136 and the S contour signal (S1+S2) is added to the addition signal S0 to produce the Sa signal.

The ratio coefficient calculation section 132 calculates averages Rave, Gave, and Bave of the pixel signals having the same color in the signals of the 7×7 pixel arrangement P61 formed by the RGB Bayer arrangement. The edge processing section 134 detects the signal (edge signal) of the edge portion in the subject image to perform the edge processing. In the edge processing section 134, the average of all the signals having the same color in the 7×7 pixel arrangement P61 is not used as the ratio coefficient. Rather, the R signal, G signal, and B signal ratio coefficients are calculated while separated into the large, medium, and small levels like the processing of FIG. 7, and the ratio coefficient calculated according to the large level or small level is used in the edge area of the signal while the ratio coefficient calculated according to the medium level is used in a flat area of the signal. The three ratio coefficients Ka (="Rave/Save", "Gave/Save", and "Bave/Save") corresponding to the second addition signal Sa are calculated based on the average values Rave, Gave, and Bave and the average value Save in which the average values Rave, Gave, and Bave are added. The RGB generating section 133 generates new signals Rs=Sa×(Rave/Save), Gs=Sa×(Gave/Save), and Bs=Sa×(Bave/Save) using the addition signal Sa and the ratio coefficients Ka. At this point, the new Rs, Gs, and Bs signals are produced using the Hi-level ratio coefficient when the S contour signal is in the Hi (positive) state, and the new Rs, Gs, and Bs signals are produced using the Lo-level ratio coefficient when the S contour signal is in the Lo (negative) state. Thus, the Rs, Gs, and Bs signals are produced by calculating the Hi or Lo state of the S contour signal, so that the generation of the false color signal can be suppressed in the edge area even if the resolution positions of the R, G, and B signals are shifted by the chromatic aberration.

FIG. 12 shows an example of a method for generating the G contour signal in the color correlation RGB generating section 13a of FIG. 10. Similarly to the processing of FIG. 3, the interpolation processing is performed to the G signal. Similarly to the processing of FIG. 4 or 5, the S1 contour signal is produced. Then, similarly to the processing of FIG. 3, the average of 3×3 pixels P72 within a 5×5 pixel arrangement P71 to which the weighting averaging processing is performed is calculated from the interpolation processing signal of the G signal to produce the new G' signals of the 3×3 pixels P72. The contour extraction filtering processing is performed to the signals of the 3×3 pixels (signal of the center pixel is multiplied by 8 and signals of the peripheral pixels are multiplied by −1), and the signal G33" is produced as the S2 contour signal having frequency half the critical resolution frequency. The S1 contour signal and the S2 contour signal are added to the first addition signal S.

According to the second embodiment, the same effect as the first embodiment can be obtained. Additionally, the first addition signal S is produced for the 5×5 pixel arrangement having the number of pixels larger than that of the 3×3 pixel arrangement, so that the random noise of the first addition signal S can further be reduced. The two kinds of the contour signals (the contour signal S1 having the critical resolution frequency and the contour signal S2 having frequency half the critical resolution frequency) are extracted as the contour signal constituting the high-frequency component based on the G signal, the contour signals are added, and the contour signal (S1+S2) is added to the S signal. Therefore, the edge blurring (high-frequency contour blurring of the signal) can be improved.

Third Embodiment

FIG. 13 is a block diagram showing a schematic configuration of a CMOS image sensor according to a third embodiment of the invention. The configuration of the third embodiment differs from that of the first embodiment in a sensor section 11b and a color correlation RGB generating section 13b.

The different components will mainly be described below. It is assumed that the color filter arrangement of the sensor section 11b is formed by a primary color filter based on a WRGB filter having a 2×2 array, and a W filter is formed by a color filter which transmits the RGB signals. Therefore, the sensor section 11b separates the light signal collected by the lens 18 into W, R, G, and B signals, the two-dimensional photodiode array converts the W, R, G, and B signals into the signal charges, and ADC 112 converts the signal charges into the digital signals and supplies the digital signals.

The color correlation RGB generating section 13b converts the W signal into the W signal corresponding to the G signal level in order to perform the contour signal extraction processing, and performs high-resolution pseudo-G interpolation processing to produce the S contour signal from the W signal.

FIG. 14 shows an example of a basic processing method in the color correlation RGB generating section 13b of FIG. 13. The filtering calculation of the 3×3 pixel arrangement P82 is performed around the center pixel (T pixel) of the 5×5 pixel arrangement P81. At this point, the signal of the T pixel in the 3×3 pixel arrangement P82 is multiplied by 4, the signals of the four pixels located in the vertical and horizontal portions adjacent to the T pixel are multiplied by 2, and the signals of the four pixels located in the corner portions are multiplied by 1. Then, the signal level of the sum of these signals is multiplied by 1/16. The obtained signal is set to the addition signal (first addition signal) S0 of the 3×3 pixel arrangement P82. Then, each of the S signal from BPF 136 and the S contour signal is added to the addition signal S0 to produce the Sa signal.

Then, the Hi-level, Mid-level, and Lo-level averages Rave, Gave, and Bave are calculated according to the signal levels of the same color signals in the 3×3 pixel arrangement. Then, the average Save (=Rave+Gave+Bave) is calculated in each level. In the edge portion of the subject, the Hi-level, Mid-level, and Lo-level ratio coefficients Ka are selected based on the S contour signal. The ratio coefficients Ka include Rave/Save, Gave/Save, and Bave/Save. The RGB generating section 133 produces the new signals Rs (=Sa×Rave/Save), Gs (=Sa×Gave/Save), and Bs (=Sa×Bave/Save) using the ratio coefficients Ka and the Sa signal. At this point, the new Rs, Gs, and Bs signals are produced using the Hi-level ratio coefficient when the S contour signal is in the Hi (positive) state, and the new Rs, Gs, and Bs signals are produced using the Lo-level ratio coefficient when the S contour signal is in the Lo (negative) state.

FIGS. 15A to 15C show examples of a pseudo-G signal generation processing method with the W signal and G signal in the color correlation RGB generating section 13b of FIG. 13. As shown in FIG. 15A, a pseudo-G signal is produced from signals of the six W pixels in the 5×5 pixel arrangement P91. As shown in FIG. 15B, an average (W+W+W+W+W+W)/6 of the signals of the six W pixels is set to Wave, and an average (G+G+G+G+G+G)/6 of the signals of the six G pixels in the 5×5 pixel arrangement P91 is set to Gave. A coefficient Kgw (=Gave/Wave) is calculated in order to match the signal level of the W pixel with the signal level of the G pixel, and the W signal is multiplied by the coefficient Kgw, which allows the pseudo-G signal to be produced.

As shown in FIG. 15C, in the edge area, the signals of the six W pixels and the signals of the six G pixels are arranged in the descending order, and a coefficient KgwH (=GHave/WHave) is calculated from averages WHave=(W5+W6)/2 and GHave=(G5+G6)/2 of the signals of the maximum and second maximum two pixels. Similarly, a coefficient KgwL (=GLave/WLave) is calculated from averages WLave=(W1+W2)/2 and GLave=(G1+G2)/2 of the signals of the minimum and second minimum two pixels.

When a difference (G6−G1) between the maximum G signal and the minimum G signal is more than a predetermined level, the determination of the edge area is made. Then, a difference (G6−G3) between the two G signals ranked on the top side is compared to a difference (G4−G1) between the two G signals ranked on the lower side to select the smaller coefficient KgwH or KgwL. The high-resolution pseudo-G signal can also be produced from the signals of the W pixels using the coefficient selected in the above-described manner. In addition, the pseudo-W signal is produced from the G signal in accordance with the above processing.

FIG. 16 shows an example of the interpolation processing method for generating the G signals at the R and B pixel positions in the color correlation RGB generating section 13b of FIG. 13. In the case of FIG. 16, the resolution is emphasized when the G signal is interpolated by the high-frequency component. Therefore, in the case where the G signal is produced at the position of the R pixel, the interpolation pixel is selected using the R signal. Similarly, in the case where the G signal is produced at the position of the B pixel, the interpolation pixel is selected using the B signal. FIG. 16 shows the case in which the G signal is produced at the position of the R3 pixel of the 3×3 pixel arrangement P102 within the 5×5 arranged pixels P101, and the signals KW2 and KW4 produced in the manner of FIG. 14 are shown as the signal of the W pixel. The absolute values of the differences between the signal of the R3 pixel and the signals of the R1, R2, R4, and R5 pixels around the R3 pixel are calculated as the G signal gm of the R3 pixel. The position of the minimum pixel is obtained from the result of the absolute values of the four difference signals. The G signal gm produced at the position of the R3 pixel is interpolated by the signal of the pixel in the same direction as the minimum pixel. For example, in the case where the R2 pixel has the minimum difference signal, the interpolation is performed while the signal of the pixel signal KW2 is used as the G signal gm of the center pixel R3. Thus, the high-resolution G signal (gm) can be interpolated. In the case where all the four difference signals are small, the S/N can be improved by performing the interpolation with the average of the signals of the four G pixels. The interpolation processing may be performed using another G signal.

FIG. 17 shows an example of a method for generating the G contour signal in the color correlation RGB generating section 13b of FIG. 13. As described above with reference to FIG. 16, the contour signal S1 of the G signal is produced using the G signal produced for the interpolation. Similarly to the processing of FIG. 5, the G contour signal is produced. For example, the signal of the G33 pixel located in the center of the 3×3 pixel arrangement P112 within a 5×5 arranged pixels P111 is multiplied by 8, and the signals of the KW22, g23, KW24, g32, g34, KW42, g43, and KW44 pixels are multiplied by −1. Then, the signal G33' is produced as the G contour signal by adding these signals. The G contour signal G33' is not generated (zero) in the even subject, rather is generated in the case where the vertical-striped or horizontal-striped pattern is generated. The S contour signal is produced based on the G contour signal.

According to the third embodiment, the same effect as the first embodiment can be obtained. At this point, the W pixel is used to increase the S signal amount, so that the imaging sensitivity can be improved.

Other Embodiments

In the above embodiments, the 5×5 pixel arrangement and the 7×7 pixel arrangement have been described by way of example. Additionally, the S/N and the image quality can be emphasized by increasing the number of pixels.

In order to improve the RGB color reproduction, the RGB matrix circuit, which is one of the factors that cause the S/N of the color camera to deteriorate, performs the RGB matrix calculation by Formula 1.

[Formula 1]

$$\begin{pmatrix} R \\ G \\ B \end{pmatrix} = \begin{pmatrix} 1.83 & -0.80 & -0.03 \\ -0.68 & 2.48 & -0.80 \\ -0.33 & -0.80 & 2.13 \end{pmatrix} \times \begin{pmatrix} Rs \\ Gs \\ Bs \end{pmatrix} \quad (1)$$

In the processing of Formula 1, two colors are subtracted for one color. That is, an amount in which two colors are mixed in the one color is subtracted to emphasize a purity of the one color, thereby improving the color reproduction. Examples of the color mixing factor include spectral characteristics of the color filter, an optical crosstalk to the photodiode of the sensor, and signal diffusion in the silicon substrate of the sensor. Conventionally, because the noise is randomly generated in the Rs, Gs, and Bs signals, the noise amount is increased by the subtraction processing.

On the other hand, in the embodiments of the invention, since the random noise of the Rs, Gs, and Bs signals has the same component, advantageously the random noise is reduced by the subtraction processing. For example, in producing the R signal, when the Rs signal is increased by the random noise, the Gs and Bs signals are also increased. Because the Gs and Bs components are subtracted from the Rs signal through the matrix calculation in the R signal, the larger signal is subtracted when the random noise becomes larger. Therefore, the larger signal is subtracted in the R signal. On the contrary, when the Rs signal is decreased by the random noise, the signals Gs and Bs are also decreased. In the R signal, although the Gs and Bs components are subtracted from the Rs signal through the matrix calculation, the smaller signal is subtracted when the random noise becomes smaller. Therefore, the small decrease in signal level is generated in the R signal. As a result, the R signal has the effect of reducing the random noise. Similarly, the random noise of the C and B signals is also reduced.

Even if the image signal processing apparatus of the invention is applied to the CMOS image sensor having the different color filter arrangement, after the RGB signals are produced, the addition signal S is produced, and the new Rs, Gs, and Bs signals are produced based on the calculation of the ratio coefficients of the RGB signals. Therefore, the same effect as the embodiments can be obtained.

The image signal processing apparatus of the invention is not limited to the CMOS image sensor, and can be applied to other charge-coupled device (CCD) sensors and stacked sensors. The image signal processing apparatus of the invention can also applied to a dedicated ISP (Image Signal Processor) which is formed into another chip independent of the sensor.

When the image signal processing apparatus of the embodiments according to the invention are applied to the case in which the sensor section adds 10-bit ADC signals of four pixels to produce the S signal, the addition processing can form the finer actually 12-bit S signal, and the actual saturation signal amount is multiplied by 4. Additionally, the addition processing of the four pixels is performed to reduce the random noise to about half. When the saturation signal amount is multiplied by 4 while the random noise is reduced to the half, a dynamic range (saturation signal amount/random noise) can be multiplied by 8. Furthermore, when the addition processing is performed to the 16 pixels of the 4×4 pixel arrangement, the saturation signal amount can be multiplied by 16, the random noise can be multiplied by ¼, and the dynamic range can be multiplied by 64. Even if the saturation signal amount is lowered by the fine pixel, the saturation signal amount is multiplied by 4 when the addition is substantially performed to the four pixels. Therefore, the same S/N as in the conventional technique can be obtained even if the saturation signal amount is decreased to substantially one-fourth of the conventional technique. For example, in the case of the saturation signal amount of 10000 ele, shot noise (square root of the saturation signal amount) becomes 100 ele and a S/N of 40 dB is obtained. In the case of the saturation signal amount of 2500 ele, the shot noise becomes 50 ele and a S/N of 34 dB is obtained. However, when the image signal processing apparatus the embodiments of the invention is applied, the addition of the four pixels is performed, and signal amount becomes 10000 ele which is four times of the conventional technique. At this point, because the noise is only doubled, the noise becomes 100 ele. Consequently, a S/N of 40 dB is obtained. The S/N can be maintained even if the actual saturation signal amount becomes one-fourth.

In the image signal processing apparatus of the embodiments of the invention, because the image quality deterioration caused by the chromatic aberration of the lens 18 is avoided, high sensitivity can be realized by decreasing the F value of the lens 18. Additionally, a low-profile camera module can be realized by decreasing a height of the lens 18. As a result, the compact camera module equipped for the low-profile portable telephone can easily be realized.

In the embodiments, the single-plate color camera in the RGB format or WRGB format has been described by way of example. However, because the chromatic aberration is also generated in the three-plate color camera in which a prism is used to obtain the three primary color RGB signals, the high sensitivity and the countermeasure against the chromatic aberration can be achieved by the principle similar to those of the embodiments. When the image signal processing apparatus of the embodiments according to the invention is applied to a monochrome sensor to perform contour correction, the signal is increased and the noise is reduced, so that the sensitivity can be emphasized and the dynamic range can be enlarged.

Not only can each of the embodiments solely be implemented, but also the embodiments can be implemented by an appropriate combination. Various inventive stages are included in the embodiments, so that the various inventive stages can be extracted by an appropriate combination of plural constituents disclosed in the embodiments.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image signal processing apparatus comprising:
   a sensing section which includes two-dimensionally arranged red (R), green (G), and blue (B) pixels formed of photoelectric conversion elements which convert an image signal to a charge signal and R, G, B filters, respectively, and produces R, G, and B color signals of R, G, and B color components of the image signal;
   a first adding section which adds, while weighting pixels in a predetermined ratio, a color signal of a center pixel of a predetermined pixel arrangement within the two-dimensionally arranged pixels and color signals of a plurality of peripheral pixels surrounding the center pixel within the two-dimensionally arranged pixels to produce a first addition signal;
   a contour signal generating section which generates a contour signal from the color signals before being added by the first adding section;
   a second adding section which adds the contour signal generated by the contour signal generating section to the first addition signal produced by the first adding section to produce a second addition signal;
   a ratio coefficient calculation section which calculates a ratio coefficient of an average value of the R, G, and B color signals of the pixels in units of a color within the predetermined pixel arrangement to a sum-up value of the average values; and
   an RGB signal generating section which generates new R, G, and B signals using the ratio coefficients calculated by the ratio coefficient calculation section and the first or second addition signal, and
   further comprising an amplitude emphasizing section which extracts a signal of a midrange frequency from the first addition signal and add the extracted signal to the first addition signal or subtract the extracted signal from the first addition signal to emphasize an amplitude of the first addition signal.

2. The image signal processing apparatus according to claim 1, wherein the second adding section adds the contour signal generated by the contour signal generating section to the first addition signal emphasized by the amplitude emphasizing section to produce the second addition signal.

3. An image signal processing apparatus comprising:
   a sensing section which includes two-dimensionally arranged red (R), green (G), and blue (B) pixels formed of photoelectric conversion elements which convert an image signal to a charge signal and R, G, B filters, respectively, and produces R, G, and B color signals of R, G, and B color components of the image signal;
   a first adding section which adds, while weighting pixels in a predetermined ratio, a color signal of a center pixel of a predetermined pixel arrangement within the two-dimensionally arranged pixels and color signals of a plurality of peripheral pixels surrounding the center pixel within the two-dimensionally arranged pixels to produce a first addition signal;
   a contour signal generating section which generates a contour signal from the color signals before being added by the first adding section;
   a second adding section which adds the contour signal generated by the contour signal generating section to the first addition signal produced by the first adding section to produce a second addition signal;
   a ratio coefficient calculation section which calculates a ratio coefficient of an average value of the R, G, and B color signals of the pixels in units of a color within the predetermined pixel arrangement to a sum-up value of the average values; and
   wherein the ratio coefficient calculation section calculates a ratio coefficient in accordance with a large level, a medium level, and a small level of the color signals as the ratio coefficient of the color signals produced by the sensor section.

4. The image signal processing apparatus according to claim 3, wherein an RGB signal generating section comprises a selecting section which detects an edge portion of the color signals produced by the sensing section and selects such that in a flat area of the signals use is made of the ratio coefficient calculated by the ratio coefficient calculation section in accordance with the medium level of the color signals and that in an edge area of the signals use is made of the ratio coefficient calculated by the ratio coefficient calculation section in accordance with the large level or small level of the color signals.

5. An image signal processing apparatus comprising:
   a sensing section which includes two-dimensionally arranged red (R), green (G), and blue (B) pixels formed of photoelectric conversion elements which convert an image signal to a charge signal and R, G, B filters, respectively, and produces R, G, and B color signals of R, G, and B color components of the image signal;

a first adding section which adds, while weighting pixels in a predetermined ratio, a color signal of a center pixel of a predetermined pixel arrangement within the two-dimensionally arranged pixels and color signals of a plurality of peripheral pixels surrounding the center pixel within the two-dimensionally arranged pixels to produce a first addition signal;

a contour signal generating section which generates a contour signal from the color signals before being added by the first adding section;

a second adding section which adds the contour signal generated by the contour signal generating section to the first addition signal produced by the first adding section to produce a second addition signal;

a ratio coefficient calculation section which calculates a ratio coefficient of an average value of the R, G, and B color signals of the pixels in units of a color within the predetermined pixel arrangement to a sum-up value of the average values; and an RGB signal generating section which generates new R, G, and B signals using the ratio coefficients calculated by the ratio coefficient calculation section and the first or second addition signal, and wherein the first adding section adds the color signals of nine pixels of the 3×3 pixel arrangement whose center pixel is the center pixel of the 5×5 pixel arrangement within the two-dimensionally arranged pixels to produce the first addition signal in such a manner that a level of the color signal of the center pixel of the 3×3 pixel arrangement is multiplied by 4, a level of the color signals of four pixels adjacent to the center pixel of the 3×3 pixel arrangement in row and column directions of the pixel arrangement is multiplied by 2, a level of the color signals of four pixels at corners of the 3×3 pixel arrangement is multiplied by 1, and a sum up level of the multiplied levels is multiplied by $\frac{1}{16}$.

6. An image signal processing apparatus comprising:

a sensing section which includes two-dimensionally arranged red (R), green (G), and blue (B) pixels formed of photoelectric conversion elements which convert an image signal to a charge signal and R, G, B filters, respectively, and produces R, G, and B color signals of R, G, and B color components of the image signal;

a first adding section which adds, while weighting pixels in a predetermined ratio, a color signal of a center pixel of a predetermined pixel arrangement within the two-dimensionally arranged pixels and color signals of a plurality of peripheral pixels surrounding the center pixel within the two-dimensionally arranged pixels to produce a first addition signal;

a contour signal generating section which generates a contour signal from the color signals before being added by the first adding section;

a second adding section which adds the contour signal generated by the contour signal generating section to the first addition signal produced by the first adding section to produce a second addition signal;

a ratio coefficient calculation section which calculates a ratio coefficient of an average value of the R, G, and B color signals of the pixels in units of a color within the predetermined pixel arrangement to a sum-up value of the average values; and an RGB signal generating section which generates new R, G, and B signals using the ratio coefficients calculated by the ratio coefficient calculation section and the first or second addition signal, and wherein the first adding section adds the color signals of twenty five pixels of a 5×5 pixel arrangement whose center pixel is a center pixel of a 7×7 pixel arrangement within the two-dimensionally arranged pixels to produce the first addition signal, while weighting the pixels in the predetermined ratio.

7. The image signal processing apparatus according to claim 6, wherein the first adding section produces the first addition signal in such a manner that a level of the color signal of the center pixel of the 5×5 pixel arrangement is multiplied by 8, a level of the color signals of eight pixels including four pixels of a 3×3 pixel arrangement whose center pixel is the center pixel of the 7×7 pixel arrangement and four pixels at corners of the 3×3 pixel arrangement is multiplied by 4, a level of the color signals of eight pixels including four pixels of the 5×5 pixel arrangement in row and column directions of the center pixel of the 7×7 pixel arrangement and four pixels at corners of the 5×5 pixel arrangement is multiplied by 1, a level of the color signals of the other eight pixels of the 5×5 pixel arrangement is multiplied by 2, and a sum up level of the multiplied levels is multiplied by $\frac{1}{64}$.

8. An image signal processing apparatus comprising:

a sensing section which includes two-dimensionally arranged red (R), green (G), and blue (B) pixels formed of photoelectric conversion elements which convert an image signal to a charge signal and R, G, B filters, respectively, and produces R, G, and B color signals of R, G, and B color components of the image signal;

a first adding section which adds, while weighting pixels in a predetermined ratio, a color signal of a center pixel of a predetermined pixel arrangement within the two-dimensionally arranged pixels and color signals of a plurality of peripheral pixels surrounding the center pixel within the two-dimensionally arranged pixels to produce a first addition signal;

a contour signal generating section which generates a contour signal from the color signals before being added by the first adding section;

a second adding section which adds the contour signal generated by the contour signal generating section to the first addition signal produced by the first adding section to produce a second addition signal;

a ratio coefficient calculation section which calculates a ratio coefficient of an average value of the R, G, and B color signals of the pixels in units of a color within the predetermined pixel arrangement to a sum-up value of the average values; and an RGB signal generating section which generates new R, G, and B signals using the ratio coefficients calculated by the ratio coefficient calculation section and the first or second addition signal, and further comprising a signal processing circuit which receives the new color signals generated by RGB signal generating section and carries out processing of at least one of white balance, contour emphasis, gamma correction, and RGB matrix.

9. The image signal processing apparatus according to claim 8, wherein the contour signal generating section carries out a G interpolation processing and a contour processing on the color signal of the center pixel and the color signals of the peripheral pixels for each pixel and extracts the contour signal from the interpolation processed and contour processed signals to generate the contour signal.

10. The image signal processing apparatus according to claim 8, wherein the first adding section adds the color signals of nine pixels of a 3×3 pixel arrangement whose center pixel is a center pixel of a 5×5 pixel arrangement within the two-dimensionally arranged pixels to produce the first addition signal, while weighting the pixels in the predetermined ratio.

* * * * *